March 22, 1938.    H. J. LINGAL ET AL    2,112,033
CIRCUIT INTERRUPTER
Filed Sept. 12, 1934    3 Sheets-Sheet 2
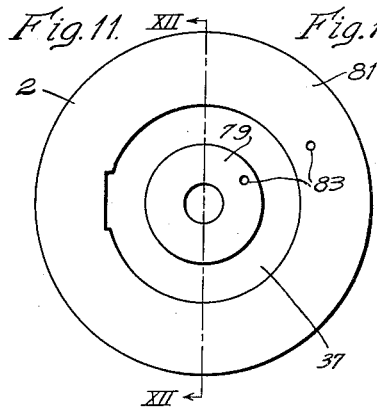
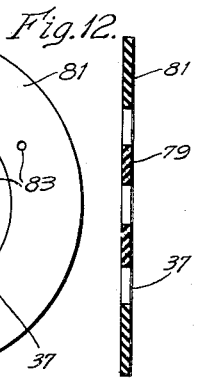
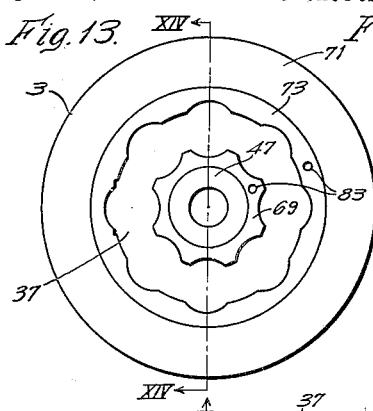
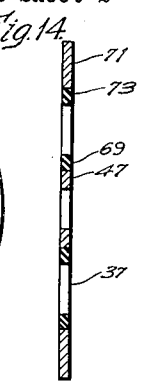
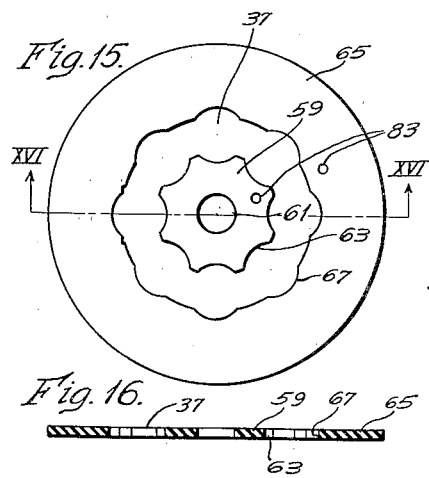
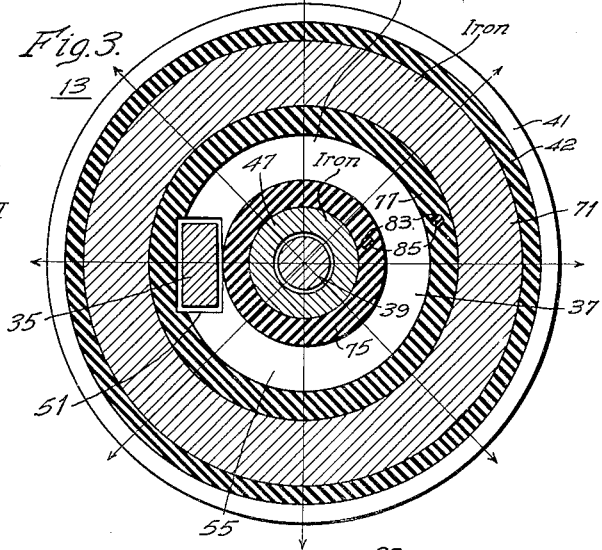
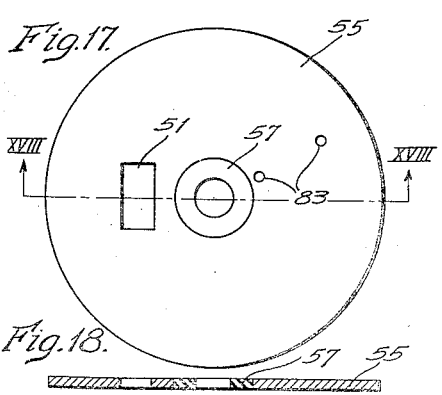
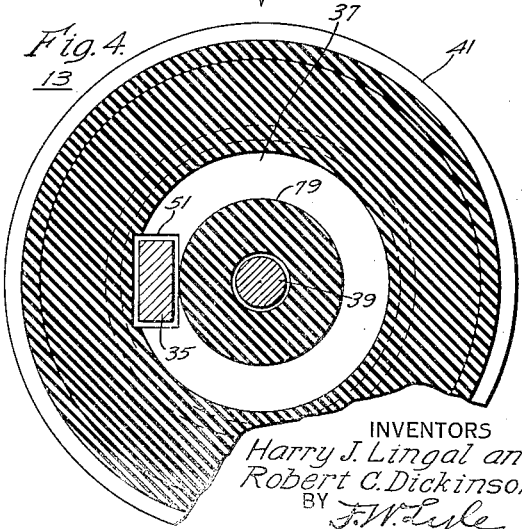
WITNESSES:
INVENTORS
Harry J. Lingal and
Robert C. Dickinson.
BY F. W. Lyle
ATTORNEY

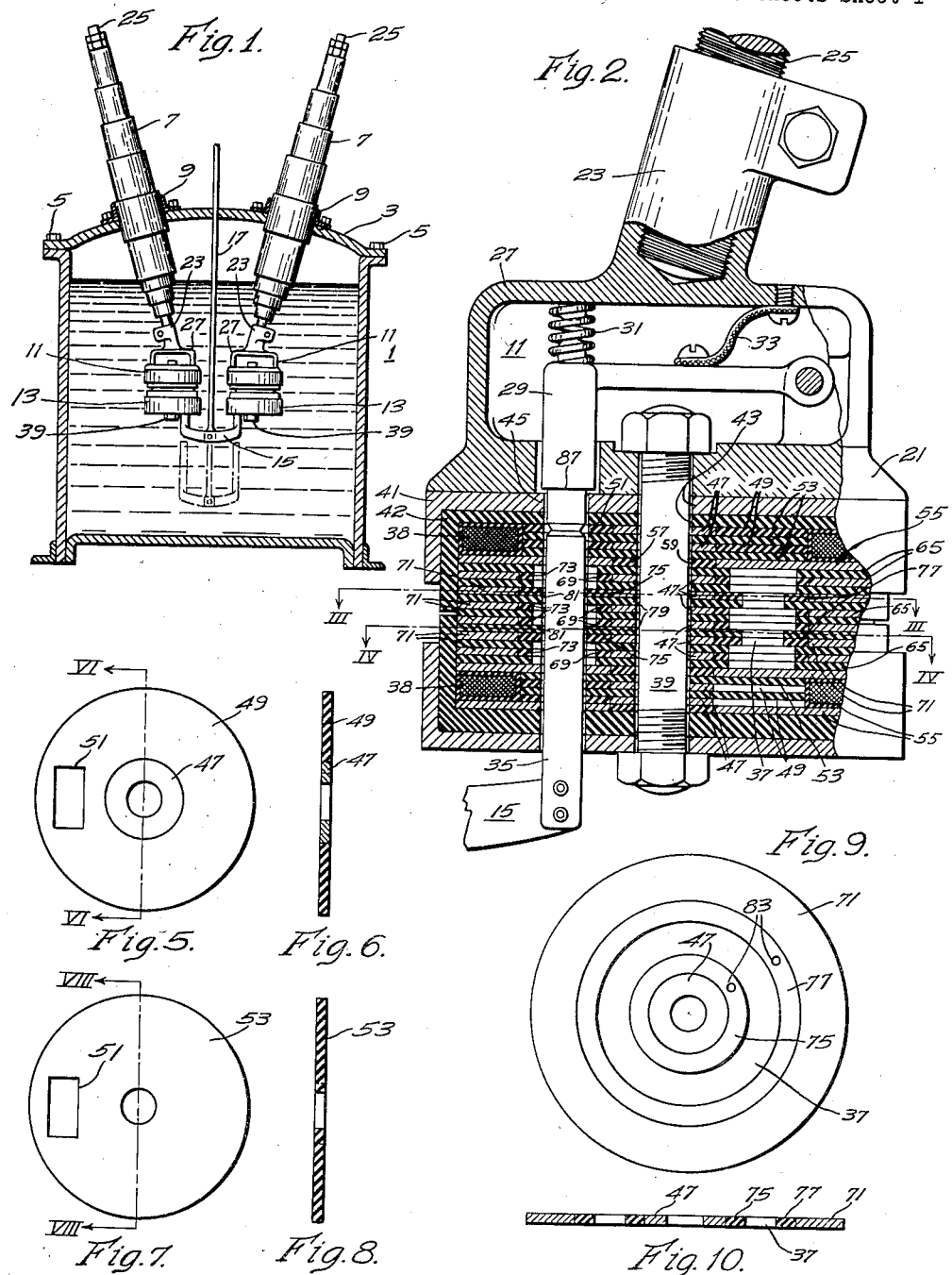

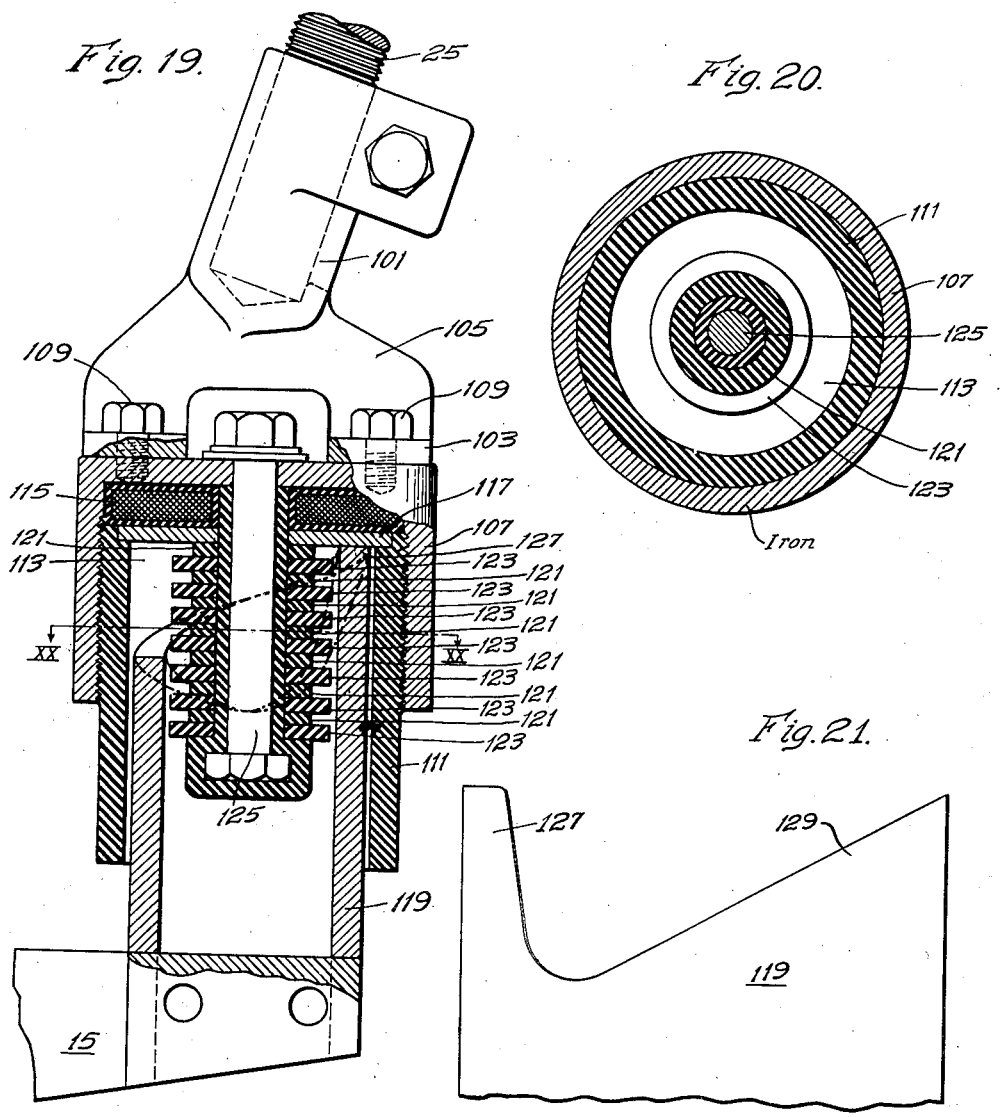

Patented Mar. 22, 1938

2,112,033

UNITED STATES PATENT OFFICE 2,112,033

CIRCUIT INTERRUPTER

Harry J. Lingal and Robert C. Dickinson, Wilkinsburg, Pa., assignors to Westinghouse Electric & Manufacturing Company, East Pittsburgh, Pa., a corporation of Pennsylvania Application September 12, 1934, Serial No. 743,697

6 Claims. (Cl. 200—147)

Our invention relates to circuit interrupters and has particular application to high capacity circuit breakers for use with power distribution systems.

The design of circuit breakers for this type of service presents a rather complex problem to the electrical art. More and more separate power systems are being interconnected into large networks, with the result that the amount of power which is available at any one point in these systems is becoming increasingly large. Despite this, fault conditions in these interconnected systems must be cleared very rapidly or the stability of the entire system will be impaired, and to further complicate the problem there is an increasing tendency on the part of public utility companies to utilize the maximum possible voltage on the interconnected systems, in order to minimize transmission losses. Thus, a commercially successful device for this type of service must be capable of interrupting very large amounts of power, at high voltages, within a very short period of time, and the principal object of the present invention is the provision of a circuit breaker which shall meet these requirements more satisfactorily than the previously known devices.

In the existing state of the art, the basic problem of circuit interruption resides in the extinction of the arc which is formed incident to the separation of the current carrying contacts. This problem has been investigated at great length in recent years, and it is fairly well established that arc extinction may be most efficiently accomplished by turbulently intermingling a quantity of fluid either in the gaseous or liquid state with the arc path proper. The greater the turbulency and the greater the quantity of un-ionized fluid which is passed through the arc stream, the more efficient the arc extinguishing operation becomes. There are two general methods for accomplishing this intermixing. One is the introduction of a jet of fluid into the arc stream, and the other is the moving of the arc in such manner that a turbulent intermixing results from the movement, or in such manner that a jet is produced as a result of such a movement.

Our invention is concerned particularly with devices wherein the arc is laterally moved within an arc passage normally containing a gas evolving substance. Devices of this general type have been utilized before, but the amount of movement of the arc has been definitely limited by the physical dimensions of the arc passage, and once the arc had been moved from one side of the passage to the other, additional movement became impossible.

This limitation created no serious difficulties for most circuits, but as the requirements of the power companies became more stringent, it has been found desirable that means should be provided for moving the arc more rapidly and for a greater distance within the arc passage than had been done heretofore, this additional movement at increased speed being necessary to give increased turbulence adjacent the arc stream during the circuit interrupting operation, thereby assuring the extinction of the arc regardless of the magnitude of the overload which might be present on the system.

In our investigations along this line, we have found that if the surrounding fluid is allowed to move ahead of the moving arc (such as through a vent at the end of a straight passageway) and if the arc speed is sufficiently great, a much more efficient extinguishment of the arc with a very considerable decrease in the arcing time, arc energy, etc., is effected. As a further development, we have found that the most suitable arc passage is of the reentrant type, it being possible to obtain a much greater arc speed and a considerably increased fluid motion for a given field strength in a reentrant arc passage than can be obtained in a straight passage which is vented at one or both ends. This improved operation is thought to be due, at least in part, to the smaller friction losses between the fluid and the confining walls of a reentrant passage. It is to be understood that, although fluid will move ahead of an arc, under the above conditions,—the arc stream acting substantially as a piston—there will also be relative movement between the arc stream and the fluid.

In the preferred embodiment of our invention, we provide a continuous or reentrant passage for the arc which has the substantial form of a hollow cylinder. This construction lends itself to the production of a very strong magnetic field, substantially at right angles to the walls of the reentrant passage, for moving the arc therein at a high velocity. In addition, the reentrant shape of the passage allows a greater length of arc passage for the space occupied than is possible in devices using a single passage which is not reentrant upon itself. Moreover, the reentrant construction allows the arc to be moved in recurrent path therewithin. The combined effect of these features is to produce a device wherein the arc may be moved at greater speeds, and over greater distances, than has been possible in the previously known devices, the result of this additional movement being to produce greater turbulence and a much higher arc extinguishing efficiency than the older structures. The entire structure is submerged in the arc extinguishing fluid.

The structure of our invention, therefore, provides means for defining an arc passage which is reentrant upon itself, which is lined with insulating material, and which is normally submerged within a body of fluid, and means for causing the arc which is established therein during the circuit interrupting operation to be moved laterally within the passage in order to effect its extinguishment. Since the passage is reentrant, this lateral movement may, if desired, be caused to follow recurrent paths. Arcing horns are provided at either end of the passage for facilitating the lateral movement of the arc, particularly when it is desired that the arc shall be moved in a recurrent path.

In the preferred embodiment of our invention, we utilize a reentrant passage which has the substantial form of a hollow cylinder, and provide magnetic means for causing the arc to be moved laterally therein, the path of movement comprising, substantially, a rotation about the axis of the arc passage. Also, we provide openings or pockets along the sides of the arc passage for retaining quantities of the arc extinguishing fluid therein, thus assuring adequate volume of gas for effecting extinguishment of the arc.

The exact form of the arc passage is not, of course, an essential feature of our invention. Any other convenient form may be used, it being necessary merely to provide means for making the passage reentrant upon itself.

We have discovered that when an arc is caused to move in a space between confining walls, the arc stream or gas envelope surrounding the arc acts in a manner similar to a piston, and forces the fluid entrapped within the arc passage to be moved ahead of the arc stream. If the confining walls define a reentrant passage and an arc is moved through this space by magnetic or other means, the fluid normally entrapped therein will be driven laterally through the arc passage by the piston action of the arc itself. This fluid motion will tend to continue after the occurrence of a zero point in the current wave, and will tend to scavenge the arc stream and to cause a substantially homogeneous body of clean un-ionized fluid to be moved between the contact members, arcing horns, etc. The result of this movement of fresh dielectric between the normally energized parts is to greatly impede the dielectric breakdown within the arc passage and to assure improved interrupting performance.

In addition to the above described effect of the movement of the arc extinguishing fluid which is produced by the piston action of the arc stream, we have discovered that the moving body of liquid normally filling the arc passage acquires considerable kinetic energy, and, during the period of current zero, it moves the ionized gas and fluid defining the arc stream proper a very appreciable distance, laterally within the arc passage. In one embodiment of our invention we have provided means for utilizing this movement to effect a progressive lengthening of the arc thereby facilitating the arc extinguishing operation.

In addition to the above-mentioned principal object, it is a further object of our invention to provide an arc extinguishing device, utilizing a substantially tubular arc passage, which shall be inexpensive to manufacture and which, at the same time, shall be very reliable in its operation.

A second further object of our invention is to provide a contact structure for circuit interrupters of the above described type which shall be so arranged that the movement of the arc produced during the circuit interrupting operation shall, if desired, effect a progressive lengthening thereof.

A still further object of our invention is to provide a circuit interrupting device which shall include separable contact means for drawing an arc, means for then moving the arc laterally on suitable arcing horns to effect a progressive lengthening thereof, and means whereby the lateral movement of the arc causes fresh dielectric to be moved into the short gap normally existing between the arc drawing members in order to prevent the arc from restriking across those members during the progress of the arc extinguishing operation.

These and other objects will be made apparent in the following description of two structures wherein are embodied the principal features of our invention. Both of these devices are of the liquid immersed type, but it is to be understood that many of the principles of our invention are equally applicable to circuit interrupters which utilize any suitable fluid. Referring particularly to the drawings, Figure 1 is a sectional view, partially in elevation, of a double break, single pole circuit interrupter utilizing arc extinguishing devices constructed according to our invention, Fig. 2 is a sectional view, also partially in elevation, through one of the arc extinguishing devices utilized in the circuit breaker shown in Fig. 1, Fig. 3 is a sectional view on the line III—III of Fig. 2, Fig. 4 is a sectional view on the line IV—IV of Fig. 2, Figs. 5 through 18, inclusive, are views of the various plate elements which are utilized in building up the arc extinguishing structures shown particularly in Figs. 2, 3, and 4, Fig. 19 is a sectional view, similar to Fig. 2, showing a modified form of our improved arc extinguishing structure which is suitable for use with the breaker shown in Fig. 1, Fig. 20 is a sectional view on the line XX—XX of Fig. 19, and Fig. 21 is a developed view, at a reduced scale, of the moving contact shown in Fig. 19.

The circuit breaker shown in Fig. 1 is of the conventional fluid-immersed type and includes a tank or closure 1 which is provided with a suitable cover 3 affixed thereto by means such as the stud bolts 5. A pair of insulating bushings 7 are supported on the cover 3 through the agency of flanges and bolts 9, and each of these bushings 7 is adapted to support one of the stationary contact structures 11 and one of the arc extinguishing devices 13 which together form the two breaks of the interrupter. A bridging member 15 is provided for electrically connecting the two stationary contact assemblages 11 when the circuit breaker is in the closed-circuit position. This bridging member 15 is supported upon an insulating pull rod 17 and is adapted to be actuated by a suitable mechanism (not shown). The lower end of each of the insulating bushings 7, the stationary contact structures 11, and the arc extinguishing device 13, are normally submerged in the body of oil or other insulating fluid contained within the tank 1.

Each of the contact structures 11 comprises a cast frame which is provided with a circular base portion 21, a clamp portion 23 adapted to engage the lower end of the conductor 25 forming a part of the cooperating insulating bushing 7, and a U-shaped portion 27 which connects the base and clamp portions. A movable contact member 29 is pivotally supported upon the base portion 21 of each of the main frame structures and is biased in the direction of the bridging member 15 by a spring 31. A flexible shunt 33 serves to connect each of these movable contact members 29 with the cooperating frame structure.

The electrical circuit through the breaker is thus comparatively direct. Beginning with one of the conductors 25 disposed within the insulating bushings 7, the current flows successively through the main supporting frame 19 which is affixed to the lower end of that conductor, the flexible shunt 33 connecting the associated movable contact member 29 with the frame, the movable contact member itself, and thence through the adjacent upstanding portion 35 of the bridging member 15 and the central portion of the bridging member to the other stationary contact structure 11, where a substantially similar path is followed.

Each of the arc extinguishing devices 13 comprises essentially a plurality of superposed plates having aligned openings therein for defining a tubular arc passage 37 which has the substantial form of a hollow cylinder. Magnetic means, which include a pair of coil members 38 adapted to be connected in series with the circuit controlled by the breaker during the circuit interrupting operation and a plurality of iron plates, are provided for causing a radial field within the arc passage 37 during the arc extinguishing operation. This radial field is at right angles to the arc passage and, by causing the arc to be moved laterally within that arc passage during the arc extinguishing operation, assures a rapid and effective extinguishment thereof. Each of the devices is supported upon and held together by a central bolt or tension member 39 which is preferably of insulating material.

As shown particularly in Figs. 2, 3, and 4, the upper portion of each of the arc extinguishing devices 13 comprises a cap member 41 of magnetic material which is adapted to be disposed about the upper portion of the plate assemblage, thereby equalizing the distribution of the arc-moving magnetic field and for giving mechanical strength to the stack structure. This member 41 is insulated from the plate structure proper by a cap member 42 of molded insulating material, and both the members 41 and 42 are provided with a central opening 43 for permitting the passage therethrough of the main bolt 39, upon which the entire structure is assembled, and a second opening 45, which is substantially rectangular in shape, in order to permit the passage therethrough of the lower portion of the adjacent movable contact 29. Immediately beneath this cap member 41 is positioned the upper of the two coils 38 which are adapted to provide the radial field within the arc passage 37 during the circuit interrupting operation. One end of this upper coil is connected to the frame 19 of the stationary contact structure, and the space between the inner periphery of the coil and the bolt 39 is occupied by four sets of plates which are shown particularly in Figs. 5 through 8, inclusive.

The upper of these sets of plates consists of an annular iron plate 47 positioned immediately adjacent the central bolt 39 and an outer plate 49 of insulating material adapted to engage the inner surface of the coil 38. These plates are shown particularly in Figs. 5 and 6, and it will be seen that the outer insulating plate 49 is provided with a rectangular opening 51 for permitting the passage therethrough of the cooperating upstanding portion 35 of the bridging member 15.

A single insulating plate 53 having a similar rectangular opening 51 therein is positioned immediately beneath the upper pair of plates 47 and 49. A second pair of plates 47 and 49 are positioned beneath this upper insulating plate 53 and a second insulating plate 53 is positioned beneath this group. The principal function of the iron plates 47 is to aid in equalizing the distribution of the radial field within the arc passage proper by reducing the reluctance of the magnetic path.

One of the arcing members 55, which is shown particularly in Figs. 17 and 18, is disposed immediately beneath the lower insulating plate 53 in each of the arc extinguishing devices. This arcing member 55 is insulated from the central bolt 39 by means of an annular plate 57 of insulating material, and it is provided with a rectangular opening 51, similar to the openings 51 in the plates 49 and 53, for permitting the passage therethrough of the cooperating upstanding portion of the bridging member.

The next elements in the stack are those which define the arc passage proper, and they include iron plates for aiding and equalizing the radial field within that passage, plates for defining the outline of the passage itself, and other plates which have openings therein for forming pockets which retain a quantity of the insulating fluid adjacent the arc passage. In the structure shown, there are three groups of the pocket forming plates and two groups of the plates which define the outlines of the arc passage itself.

A pair of insulating plates form the first element of each of the upper pocket defining groups. These plates are shown particularly in Figs. 15 and 16 and are positioned immediately beneath the upper arcing plate 55. The inner plate 59, which is of insulating material, is provided with a centrally disposed opening 61 for permitting the passage therethrough of the main bolt 39 and a plurality of cutout portions 63 in the outer edge thereof for defining the fluid retaining pockets. The outer plate 65 is provided with similar cooperating cut-out portions 67. Beneath these two insulating plates are positioned one of the groups of plates shown in Figs. 13 and 14. The inner element of this set of plates comprises one of the iron plates 47 which is also used in the upper portion of the stack, and an outer insulating plate 69 having substantially the same outline as the superposed insulating plate 59 (Figs. 15 and 16) is provided for insulating this plate 47 from the arc passage 37. A second iron plate 71 forms the extreme outer portion of this set of plates and is insulated from the arc passage by an inner liner plate 73. The next and last element in the upper pocket forming group comprises two of the insulating plates shown in Figs. 15 and 16.

The next set of plates comprises the first of the groups of plates which define the arc passage proper, and is shown particularly in Figs. 9 and 10. It comprises one of the iron plates 47, which is insulated from the arc passage 37 by an annular insulating plate 75, and one of the iron plates 71 which is insulated from the arc passage 37 by an annular insulating plate 77. Beneath these plates are positioned the two insulating plates 79 and 81 shown in Figs. 11 and 12. It will be noted that the opposed inner surfaces of the plates 75, 77, 79, and 81 define the outline of the arc passage proper 37, and since those surfaces are substantially concentric with each other, the arc passage takes the form of a hollow cylinder.

The remaining portion of each of the arc extinguishing devices comprises groups of the previously described plates. The pocket defining set which is disposed beneath the lower plates 79 and 81 are those shown in Figs. 13 and 14. Beneath this is positioned a set of plates shown in Figs. 15 and 16, and this is followed by a second set of the plates shown in Figs. 13 and 14, these plates combining to define the second of the pocket defining groups.

A pair of the plates shown in Figs. 11 and 12 are positioned immediately beneath each of these second pocket defining groups, and this set of plates is followed by one of the sets shown in Figs. 9 and 10.

The last group of plates in each of the arc extinguishing devices is a pocket defining unit exactly similar to the first of these units which was described above. Beneath this unit there is positioned the lower arcing plate 55 which is exactly similar in outline to the upper arcing plate 55.

Next in order in each of the arc extinguishing stacks is the lower coil 38 for producing a radial field within the arc passage, and the plates which insulate that coil from the central bolt. These coil insulating plates are similar to those previously described, and the uppermost consists of one of the sets of the plates shown in Figs. 7 and 8. This is followed by one of the sets of plates shown in Figs. 5 and 6. The next set is that shown in Figs. 7 and 8, and the final set is that shown in Figs. 5 and 6. A third arcing plate is positioned at the bottom of each of the stacks in order to permit the lower coil 38 to be energized during the arc extinguishing operation.

A cap member 41 of magnetic material and an insulating member 42 exactly similar to the upper members 41 and 42 are positioned at the lower end of each of the arc extinguishing devices and serve in conjunction with the upper cap members to retain the outer plates in their proper position and to give strength and rigidity to the entire structure. The opposed edges of the two members 41 in each arc extinguishing device are spaced some distance apart in order to prevent breakdown therebetween.

All of the plates which define the arc passage proper are provided with suitable openings 83 therein for engaging insulating pins 85, the ends of which project into similarly disposed openings provided in the arcing plates 55. These pins 85 assure a proper aligning of the various elements of the device during its assembly.

The lower coil 38 is connected between the two lower arcing plates 55, and the upper coil is connected as mentioned before between the frame 19 of the stationary contact structure itself and the upper arcing plate 55. Thus, when the arc is established within the arc passage 37, both of the coils 38 are connected in series therewith, that portion of the arc which is drawn between the upper arcing plate 55 and the movable contact 29 being extinguished by virtue of the fact that the upper coil 38 is in parallel therewith, and that the portion of the arc which is drawn between the lower pair of arcing plates being similarly extinguished. The coils 38 are connected so as to form poles of opposite polarity, thereby facilitating the production of radial field within the arc passage. The iron plates 47 and 71 imbedded in the walls which define the arc passage and the magnetic cap members 41 serve to equalize and assure a proper distribution of that field.

From the foregoing, it will be seen that we have disclosed an arc extinguishing device which is provided with a tubular arc passage 37 having the substantial form of a hollow cylinder wherein the arc which is drawn therein by the separation of the cooperating contact members may be moved laterally during the arc extinguishing operation. Both ends of this tubular arc passage 37 are substantially closed by an arcing member 55, thus permitting the arc to be moved laterally therein in recurrent paths, during the circuit interrupting operation, and in addition, the opposed surfaces which define portions of the arc passage 37 are provided with cut-out portions for creating fluid retaining pockets adjacent the path of movement of the arc. This assures an adequate supply of arc extinguishing fluid during the circuit interrupting operation.

Upon the occurrence of an overload capable of effecting the actuation of the operating mechanism, the bridging member 15 is moved in a downwardly direction. Almost immediately after this movement is initiated, the shoulder portion 87 of each of the two movable contact members 29 engage the upper cap member 41 forming a part of the arc extinguishing device associated therewith, and is thereby prevented from following the movement of the bridging member. An arc is thereupon established between the cooperating upstanding end 35 of the bridging member and the contact member 29.

Due to the close proximity of the upper arcing member 55, the arc drawn between the bridging member 35 and the movable contact member 29 will almost immediately contact that member, thereby causing a section of the arc to be in parallel with the upper coil 38. This short section of the arc will thereby be extinguished, since the voltage drop through the coil is less than that necessary to maintain an arc in parallel therewith, and the entire current flowing in the circuit controlled by the breaker will flow through the coil 38.

Upon further downward movement of the bridging member 15 an arc is drawn between the upper arcing member 55 and the first of the two lower arcing members 55. This arc is free to move, under the influence of the radial field set up by the coils 38, laterally within the arc passage 37 and is so moved by that field. As the circuit opening operation progresses, the upstanding portions 35 and bridging member 15 are moved entirely without the arc extinguishing devices 13, and that portion of each of the two arcs which exists between the two lower arcing members 55 is extinguished, thereby causing each of the lower radial field coils 38 to be connected in the circuit controlled by the breaker.

The combined result of the above action is to cause the formation of a very strong, arc moving, magnetic field (indicated by the arrows in Figs. 3 and 4) within the arc passage. This field effects a very rapid movement of the arc within the arc passage, the arc moving substantially around the central axis of the arc extinguisher. As a result of this high velocity movement of the arc and its attended gas envelope, extreme local turbulence is produced in proximity to the arc stream. The volatilized arc products, vapor and quantities of the arc extinguishing liquid itself are intermixed in such manner that restriking of the arc once at a zero point in the current wave has been reached is practically precluded.

The movement of the arc just described also serves to impart considerable kinetic energy to the fluid which is moved in the reentrant arc passage 37. This kinetic energy causes the fluid motion to continue after the occurrence of a zero point in the current wave and results in the moving of a quantity of relatively cool homogeneous fluid between the contact members 35 and 29, and between various portions of the arcing members 55, including the area which was last occupied by the arc.

By moving cooled un-ionized liquid over the heated portions of the arcing members, a particularly beneficial effect is produced. As is well known in the art, if the terminal point of an electric arc is positioned on a metal surface, and is not moved thereon at a very high speed, that surface becomes heated to a very high temperature and may emit a considerable number of electrons, which emission greatly facilitated the restriking of an arc after the occurrence of a zero point in the current wave. If, however, these heated, electron emitting surfaces are covered by a cooled insulating medium, it becomes much more difficult for the arc to restrike with the restoration of the voltage, and this is the effect which is produced with our invention. By virtue of the movement of the arc stream, and the liquid entrapped within the arc passage at, and subsequent, to the occurrence of current zero, the arc is forced to restrike, if it restrikes at all, between cooled metallic surfaces which offer the maximum possible impedance to that restriking. So marked is this effect that we have found that our invention practically precludes the restriking of an arc after the occurrence of one zero point in the current wave.

The structure shown in Figs. 19 through 21 operates on essentially the same principles as the previously described embodiment of our invention. That is, the device includes means for defining a substantially tubular arc passage, which is lined with insulated material, means for drawing an arc within that passage, and magnetic means for producing a radial field which causes the arc to be rotated therein during the arc extinguishing operation. There is one additional feature in this modified structure, however, and that is the provision of means whereby the rotation of the arc is caused to effect a progressive lengthening thereof.

As shown in Fig. 19, this modified form of our invention comprises a metallic bracket member 101 for engaging the lower end of the conductor 25 disposed within the cooperating insulating bushings 7, and a circular plate member 103 affixed to this bracket member 101 through the agency of a support 105, the bracket, support, and plate members being cast integral with one another. A cap shaped member 107, of magnetic material, is affixed to the lower surface of plate member 103 by means such as the bolts 109, and is threaded on its inner surfaces for engaging a tubular insulating member 111 which defines the outer walls and one of the two opposed surfaces of the tubular arc passage proper 113. A coil member 115, one end of which is electrically connected to the plate portion 103 of the stationary contact frame, and the other end of which is connected to an annularly shaped contact member 117, is positioned immediately beneath the coil 115. A hollow contact member 119, supported upon the bridging means 15 is provided for cooperating with the fixed contact 117.

A plurality of alternately disposed plates 121 and 123 of insulating material are supported upon a bolt 125 which is imbedded in insulating material and positioned within the central portion of the arc passage 113. These plates define the inner surfaces of the arc passage, and by virtue of their differing diameters form the substantial equivalent of oil pockets.

The support bolt 125 is preferably of magnetic material in order to aid in equalizing the radial field which is produced within the arc passage by the coil 115.

A developed view of the contact structure of the movable contact 119 is shown in Fig. 21, and it will be seen that this member includes a flattened contact portion 127 adapted to engage the cooperating stationary contact 117 positioned at the upper end of the arc passage 113 and a helical portion 129 along which the arc may be moved during the arc extinguishing operation.

The helical portion 129 is so arranged with respect to the polarity of the coil 115 which produces the radial magnetic field within the arc passage that the arc is caused to move thereon during its lateral movement in the arc passage itself. This movement, as mentioned above, effects a progressive lengthening of the arc, independently of that lengthening which is produced by the normal downward movement of the bridging member.

The operation of this embodiment of our invention is substantially similar to the operation of the previously described device. Upon the occurrence of a predetermined overload condition, the bridging member 15 is caused to move toward the open circuit position, thereby establishing an arc between the contact portion 127 of the movable, tubular contact member 119 and the plate contact 117 supported at the upper end of the arc passage. The coil 115 is normally connected in series with the path of current flow through the breaker, and by virtue of the resulting radial field produced within the arc passage, the arc is caused to move, immediately following its establishment, along the helical surface 129 of the movable contact member. This movement effects a progressive lengthening of the arc, which lengthening is aided by the downward movement of the contact member itself. The outer surface of the larger insulating plates 123 and the inner surface of the tubular insulating member 111 define the surfaces of the arc passage 113 wherein this movement is caused to take place. The smaller plates 121 provide means for assuring that adequate volume of insulating fluid shall be available during the arc extinguishing operation, and as a result a very rapid extinction of the arc is effected.

This modified form of arc extinguisher allows the arc to be moved therein in recurrent paths, should some difficulty be experienced in the arc extinguishing operation due to unusual circuit conditions. Further, as the movable contact member 119 nears the open circuit position, it opens the lower end of the arc passage 113 to the main body of liquid, thereby allowing the volatilized arc products to expulsively flow through the arc stream. This action, in combination with the rotary motion of the arc produced by the radial field, assures a positive extinction of any arc to which the device may be subjected.

From the foregoing, it will be seen that we have disclosed the features of a new and improved form of circuit interrupting device which operates in accordance with the principles heretofore not generally used in the circuit interrupting art. Those principles include the establishing of an arc within a tubular arc passage, having arcing members positioned at either end thereof, and then moving the arc laterally in that passage so as to effect an intimate comingling of the arc with the un-ionized fluid disposed within the arc passage in order to effect its extinguishment. Further, by embodying these principles into a fluid type breaker utilizing a continuous arc passage, it is possible to cause the arc stream to move the entrapped fluid in a manner similar to a piston, thereby assuring that a fresh supply of arc extinguishing fluid will be swept between the live parts to insure against the restriking of the arc, and that the heated portions of the arcing members which might be raised to a temperature capable of effecting independent emission of electrons will be covered with insulating medium when the arc is extinguished at a zero point in the current wave. This arrangement produces great turbulence within the arc stream during the circuit interrupting operation and makes it necessary for the arc to restrike, if it restrikes at all, between cold surfaces.

We have also shown how this arrangement of a tubular arc passage and means for laterally moving the arc therein during the circuit interrupting operation may be employed for effecting a progressive lengthening of the arc, independent of the normal lengthening produced by the separating contact members.

Also, we have shown how the lateral movement of an arc may be caused to effect the introduction of fresh dielectric into the space between the arc drawing members during the progress of the circuit interrupting operation. When this feature is combined with the above described method for effecting a progressive lengthening of the arc during its lateral movement, a particularly desirable result is brought about, in that the arc is prevented from restriking across the space between the relatively close arc drawing members and is forced to restrike, if it restrikes at all, between the diverging arcing horns.

In the above described embodiments, we have disclosed how our invention could be applied to circuit interrupters of the liquid type. The principles of laterally moving an arc in a reentrant arc passage may well be applied to breakers which are not liquid immersed, and it is our intention that the language of the accompanying claims shall cover such devices. In fact, in the structures shown, the liquid itself is not depended upon entirely for producing the arc extinguishing gas, the several insulating plates being formed of fiber or other material which is itself capable of evolving arc extinguishing gas when placed in proximity to an electric arc.

While in acordance with the patent statutes we have disclosed the foregoing details of certain operative embodiments of our invention, it is to be understood that many of these details are merely illustrative. It is our desire, therefore, that the language of the accompanying claims shall be accorded the broadest reasonable construction, and that our invention shall be limited only by what is expressly stated therein and by the prior art.

We claim the following as our invention:

1. In a circuit interrupter, means of insulating material having walls for defining a tubular shaped narrow endless slot therebetween, an arc terminal member disposed in one end of said narrow slot having an endless arc path thereon, a tubular contact member movable longitudinally in said slot for establishing an arc therein between said arc terminal member and said contact member, said contact member having an endless arc path thereon inclined with respect to the arc path on said arc terminal member, and means for producing a magnetic field radially across said slot for rotating said arc in at least one long section between said arc terminal member and said contact member in a direction to progressively lengthen the arc independently of the movement of said contact member, and means along said slot which gives off a gas when acted upon by said arc to aid in extinguishing the arc.

2. In an arc extinguisher, means of insulating material having walls for defining a tubular shaped narrow recurrent slot therebetween, said slot having sufficient length to permit an arc to play therein in one long section, a pair of spaced arc terminal members within said slot having generally annular arc paths thereon between which an arc may play, at least one of said arc terminal members having a portion of its arc path inclined with respect to the arc path on the other arc terminal member, a coil positioned coaxially with respect to said slot for producing a magnetic field radially across said slot to rotate the arc laterally in one section therein, members of magnetic material embedded in said walls for producing a uniform distribution of said magnetic field, and a material along said slot which produces a gas when acted upon by an arc to aid in extinguishing the arc.

3. In a circuit interrupter, means of insulating material for defining a tubular shaped narrow endless slot therebetween, a pair of opposed annularly shaped arc terminal members disposed within said passage, each of said arc terminal members having an annular arc path thereon, at least one of said arc terminal members having a portion of its arc path divergent with respect to the other arc path, means for establishing an arc between said arc terminal members, means for rotating said arc laterally in at least one section between said arc terminal members, substantially the whole of said slot being so narrow as to prevent substantially any movement of the arc in a direction lateral to the path of rotation, and means along said passage which gives off a gas when acted upon by said arc to aid in extinguishing the arc.

4. In an arc extinguisher, means defining a substantially annular shaped narrow slot, said slot being continuous and having considerable length in proportion to its width and in which an arc of considerable length is adapted to play in at least one section, a pair of opposed arc terminal members within said slot having annular arc paths thereon, at least one of said arc terminal members having a portion of its arc path divergent with respect to the arc path on the other arc terminal member, means for moving the arc laterally around said slot with its ends in engagement with said arc paths, and a liquid in said slot which gives off a gas when acted upon by an arc to aid in extinguishing the arc.

5. In an arc extinguisher, means of insulating material having walls for defining an annular shaped continuous narrow slot therebetween, said narrow slot having considerable length in proportion to its width and in which an arc of considerable length may play in at least one section, a pair of opposed arc terminal members within said slot having annular arc paths thereon, at least one of said arc terminal members having a portion of its arc path divergent with respect to the arc path on the other arc terminal member, means for magnetically moving the arc laterally along said walls between said arc terminal members, said slot having a plurality of recesses along one or more of its walls, and a material along said walls which gives off a gas when acted upon by an arc to aid in extinguishing the arc.

6. An arc extinguisher comprising means of insulating material having a pair of cylindrical opposed walls defining a continuous annular slot, said slot being of considerable length in proportion to its width, an arc terminal member of generally annular shape disposed in each end of said slot adapted to permit an arc of considerable length to play between said terminals in at least one section, at least one of said arc terminal members having a portion thereof inclined with respect to the other arc terminal member, at least one coil positioned outside of said slot adjacent one end thereof for providing a magnetic field radially across said slot for moving the arc laterally in one section around said slot with the ends of the arc in contact with said arc terminal members, a pole piece of magnetic material partially surrounding said coil and adjacent one end of said slot for distributing the magnetic field thereacross, said slot being sufficiently restricted in width to prevent substantially any movement thereof in a direction lateral to the path of rotation, and a liquid in said slot which gives off a gas when acted upon by an arc to aid in extinguishing the arc.

HARRY J. LINGAL.
ROBERT C. DICKINSON.